United States Patent [19]

Waki et al.

[11] Patent Number: 4,623,598
[45] Date of Patent: Nov. 18, 1986

[54] FLAT BATTERY

[75] Inventors: Eiichi Waki, Katano; Shigeo Kobayashi, Yawata; Yutaka Hashimoto; Miyoji Nakai, both of Katano, all of Japan

[73] Assignee: Matsushita Electric Industrial Co., Ltd., Kadoma, Japan

[21] Appl. No.: 711,539

[22] Filed: Feb. 22, 1985

[51] Int. Cl.⁴ .............................................. H01M 6/12
[52] U.S. Cl. ..................................... 429/162; 429/178
[58] Field of Search ............... 429/162, 152, 122, 160, 429/178, 185

[56] References Cited

U.S. PATENT DOCUMENTS

| | | | |
|---|---|---|---|
| 4,086,399 | 4/1978 | Hyland et al. | 429/162 X |
| 4,086,400 | 4/1978 | Hyland et al. | 429/162 X |
| 4,092,464 | 5/1978 | Dey et al. | 429/160 X |
| 4,105,815 | 8/1978 | Buckler | 429/162 X |
| 4,371,593 | 2/1983 | Ramey | 429/162 X |
| 4,458,411 | 7/1984 | Dey et al. | 429/162 X |

Primary Examiner—Charles F. LeFevour
Attorney, Agent, or Firm—Wenderoth, Lind & Ponack

[57] ABSTRACT

A flat battery has a flat generating element which is sealed and sheathed within a two-fold electrically insulating sheathing film, and positive and negative terminals are provided on either the upper or the lower surface thereof. The capacity of the battery per unit area is increased, and either the positive or the negative terminal, which can extend along the inner side of the film, can be reduced in size and simplified.

10 Claims, 6 Drawing Figures

FLAT BATTERY

FIELD OF THE INVENTION

The present invention relates to a flat battery wherein a flat generating element is sealed and sheathed with a sheathing film and both positive and negative terminals are installed on one surface of either the upper or the lower portion thereof, and the invention provides a flat battery whose battery capacity per unit area is high.

BACKGROUND OF THE INVENTION

With recent reductions in the size and weight of battery-using equipment, there is a pressing need to reduce the size and weight of batteries and to reduce their thickness. Various types of thin batteries have been proposed for use in such equipment. Among them is a flat battery wherein positive and negative terminals are vertically put together with a separator interposed therebetween and the assembly is sealed in a sheathing film of multilayer construction mainly using a resin film. The sheathing film used therein has a laminate form in which a thin aluminum film is interposed between polyester films and these films are integrated together, and disposed on the innermost side is a heat-sensitive adhesive agent layer in firm form. The upper and lower surfaces of this sheathing film are formed with through-going holes, and exposed portions of positive and negative collectors thermally bonded to the inner adhesive layer on the sheathing film are used as positive and negative terminals. Disposed on the positive collector thermally bonded to the sheathing film is a positive active material and disposed on the negative collector is a negative active material, with a separator of polypropylene non-woven fabric interposed therebetween, said separator serving as a liquid retaining material as well. An electrolytic solution, e.g., an inorganic salt, lithium borofluoride, dissolved in γ-butyrolactone, which is an organic solvent, is injected into the separator and positive active material, and then the periphery of the sheathing film is thermally bonded for sealing. This construction in which positive and negative terminals are disposed on both the upper and lower surfaces of the flat battery encounters some problems in the use of the battery. That is, the thinness of the flat battery cannot be effectively utilized when the battery is used. For example, suppose that the flat battery is 1.5 mm thick and that the plate spring-like terminals of the battery receiving case installed on battery-using equipment are 2 mm thick, then the clearance in the interior of the battery receiving case will be required to be at least 5.5 mm, so that the thinness of the flat battery is not effectively utilized. Further, in this case, the flat battery will be located in the middle of the battery receiving case while it is held between the plate spring-like terminals within the battery receiving case, so that the area of contact with the bottom plate of the battery receiving case is reduced, leading to instability and positional deviation. Thus, a construction in which both positive and negative terminals are installed on one surface of the flat battery is advantageous in use. An example of a construction in which both positive and negative terminals are installed on one surface of the flat battery is disclosed in Japanese Laid-Open Utility Model Application No. 91065/1980. With the disclosed construction, however, the battery capacity per unit area cannot be increased because of limitations imposed by the bond portion of the sheathing film and by the withdrawal of the positive and negative terminals. Another construction in which positive and negative terminals are installed on one surface of the flat battery is disclosed in Japanese Laid-Open Patent Application No. 15042/1973, and in this construction the battery itself has terminals on its upper and lower sides, a portion of one terminal being extended to the other, whereby the positive and negative terminals are installed on one surface of the completed flat battery. Thus, structurally, it is necessary to make one terminal portion longer and larger, the construction being complicated.

Thus, there has been desired a battery wherein both positive and negative terminals are installed on either the upper or the lower surface of the flat battery and the battery capacity per unit area can be increased while either the positive or the negative terminal extended inside the sheathing film is small in size and simplified.

SUMMARY OF THE INVENTION

The present invention is characterized in that a sheathing film serving as an electrical insulation and an anti-electrolytic solution, e.g., aluminum film is laminated between polyester films, both positive and negative terminal holes are formed in one surface of the two-fold sheathing film having a film-like heat-sensitive adhesive layer disposed on the innermost side, positive and negative collectors are disposed to close said positive and negative terminal holes from inside to allow the exposed terminal hole portions to serve as positive and negative terminals, one of said positive and negative collectors together with said sheathing film is bent to be folded in two, the three sides other than the bent side being sealed, and a flat generating element consisting of positive and negative active materials is enclosed in the sheathing film to contact said positive and negative collectors, so that the positive and negative terminals are disposed on the same planar surface of the flat battery.

DETAILED DESCRIPTION OF THE PREFERRED EMBODIMENT

Figure 1:
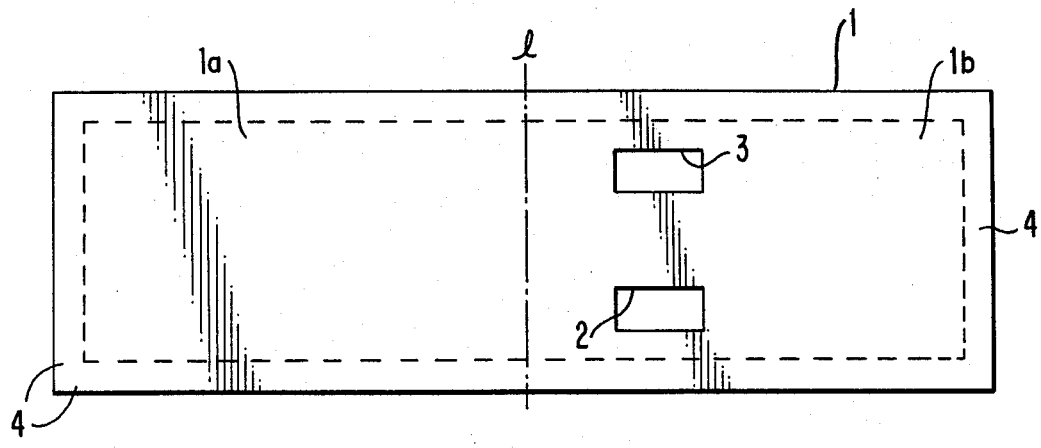
FIG. 1 is a plan view of a sheathing film used in an embodiment of the present invention.

FIGS. 1 through 6 illustrate the assemblying process for the flat battery of the present invention. In the figures, reference numeral 1 denotes a sheathing film having heat sealability, said film being of multilayer construction wherein polyester films are laminated on both surfaces of an aluminum foil and a heat-sensitive adhesive layer is disposed on that side of the sheathing film which becomes the inner side when it is folded in two. In the final step, this film will be folded in two along the middle together with one collector and three peripheral sides will be thermally bonded and the generating element will be sealed in the interior. The middle 1 of the length of the sheathing film will be taken as the boundary, and the left-hand side surface portion 1a will be hereinafter referred to as the first surface portion and the right-hand side surface portion 1b as the second surface portion. The numerals 2 and 3 denote positive and negative terminal holes formed in the second surface portion, and reference numeral 4 denotes a bond margin.

Figure 2:
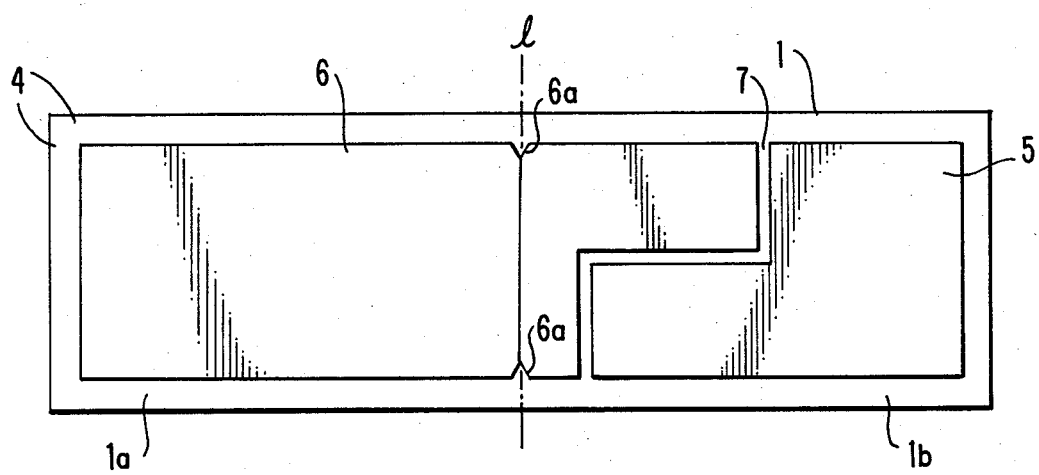
FIG. 2 is a top view showing positive and negative collectors disposed on the innermost side of the sheathing film.

To assemble the flat battery, as shown in FIG. 2, a positive collector 5 in the form of a reversed L-shaped aluminum sheet is laid on the second surface portion 1b of the sheathing film 1 so as to cover the positive terminal hole 2 from one side. A negative collector 6 in the form of a nickel sheet is then placed to continuously cover the first surface portion 1a and the negative terminal hole 3 of the second surface portion 1b. In addition, a crank-shaped clearance 7 is left between the extensions of said positive and negative collectors 5 and 6 so that they do not contact each other. The negative collector 6 will be folded along the middle 1 in the final step, and to facilitate this folding, the upper and lower edge portions associated with the middle 1 are formed with V-shaped notches 6a. In this example, the negative collector 6 has a size such that it covers the portion of the first surface portion 1a excluding the bond margin 4 and covers the peripheral portion of the negative terminal hole 3, while the positive collector 5 has a reversed L-shape such that it covers the portion of the second surface portion 1b excluding the bond margin while leaving the clearance 7 between the positive and negative collectors. However, these collectors may be of any desired shape and much smaller than those shown in FIG. 2, and their illustrated arrangement may be reversed.

Subsequently, an electrically insulating sheet 8 of L-shaped multilayer construction consisting of a heat resistant resin film and a heat sensitive resin adhesive film is thermally bonded so as to cover the region of the negative collector 6 around the middle 1 and its region extending to the second surface portion 1b. Metal lithium, which is a negative active material 9, is stuck to the portion 6' of negative collector 6 on the first surface portion 1a (FIG. 3).

Figure 3:
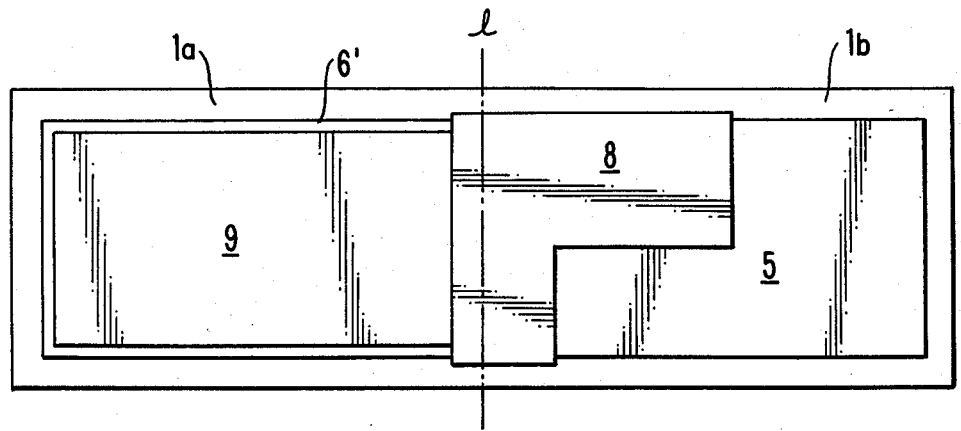
FIG. 3 is a top view in which an electrically insulating sheet is bonded to extend from the middle of the sheathing film to the extension of one collector so as to cover the same and a negative active material is stuck to one collector.
Figure 4:
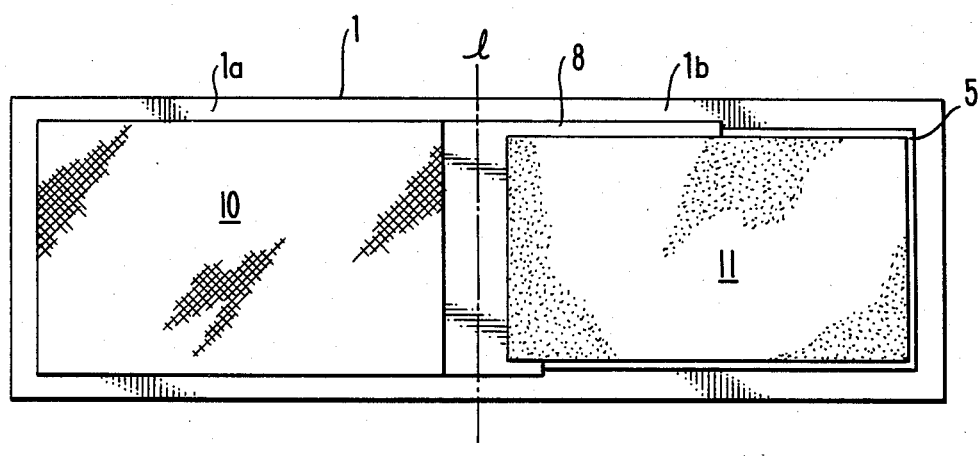
FIG. 4 is a top view showing a positive pole agent extending across the other collector and across the electrically insulating sheet.
Figure 5:
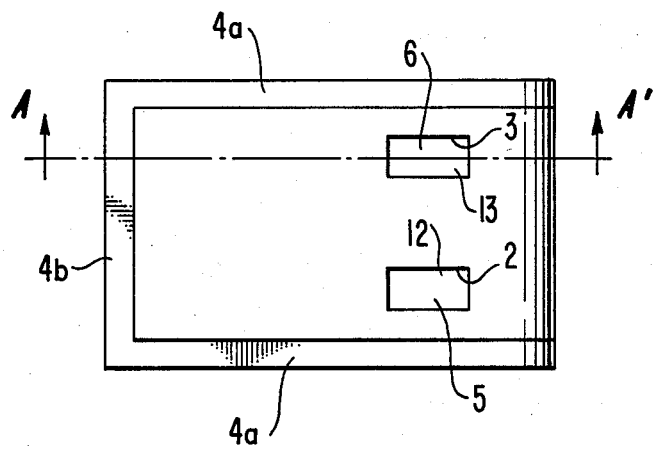
FIG. 5 is a top view in which the sheathing film together with one collector and electrically insulating sheet is folded in two and the three sides of the sheathing film are heat-sealed.

A separator 10 of polypropylene non-woven fabric is then placed to cover the exposed portions of the negative active material 9 disposed on the negative portion 6' on the first surface portion 1a shown in FIG. 3, and the negative portion 6'. A positive mix agent 11 which is in the form of a mixture of carbon fluoride, which is an active material, acetylene black and a resin binder, pressure bonded to an expanded titanium core, is laid on the portions of the positive collector 5 and electrically insulating sheet 8 disposed on the second surface portion 1b (FIG. 4). The sheathing film 1, the negative collector 6 covered with the separator 10 and electrically insulating film 8, and the electrically insulating film 8 are then bent along the middle 1, as shown in FIG. 5. Of the bond margin 4 of the bent sheathing film 1, the upper and lower bond margin portions 4a (as shown in FIG. 5) are then thermally bonded to provide a bag form. A predetermined amount of electrolytic solution prepared by dissolving lithium borofluoride in γ-butyrolactone is then injected into the assembly and while degassing the same in a vacuum, the remaining bond portion 4b is thermally bonded for sealing. The positive and negative collectors 5 and 6 exposed through the terminal holes 2 and 3 formed in the sheathing film serve as the positive and negative terminals 12 and 13, respectively. By this procedure it is possible to form a thin flat battery having both positive and negative terminals installed on one surface of the sheathing film. A 43 mm wide, 70 mm long and 1.5 mm thick battery was produced which, when discharged at a constant resistance of 500Ω, registered a capacity of about 350 mAh.

Figure 6:
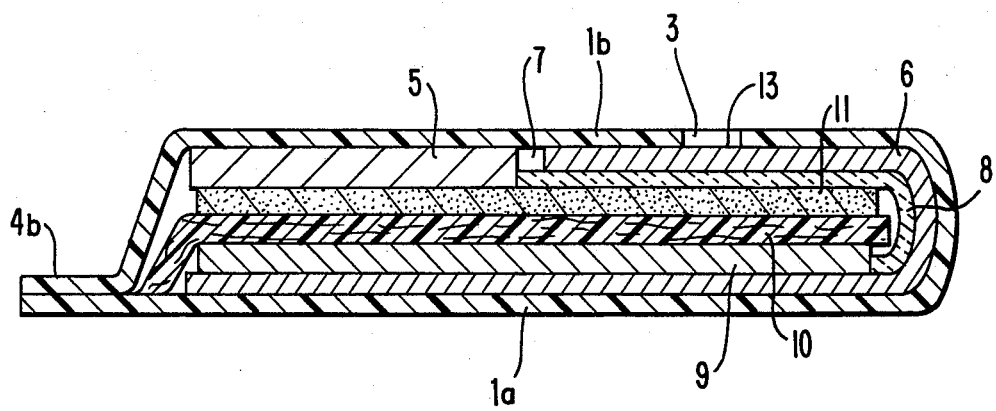
FIG. 6 is a sectional view of the flat battery taken along the line A-A' in FIG. 5.

FIG. 6 is a sectional view taken along the line A-A' in FIG. 5.

The flat battery of the present invention is constructed, as described above, by forming both positive and negative terminal holes in one surface of a single two-fold sheathing film, closing said positive and negative terminal holes by collectors of respective poles, the collector of one pole being bonded to the sheathing film to extend across the other surface of the two-fold sheathing film, and positioning a flat generating element consisting of positive and negative active materials and a separator on the collectors, bending the sheathing film along the middle thereof, and thermally bonding the remaining three sides to seal the same. Thus, as compared with the conventional arrangement wherein the four sides are sealed, the opposed positive and negative pole areas can be increased by an amount corresponding to one side having no bond margin, and so can the battery capacity per unit area. Further, since both positive and negative terminals are installed on one surface of the flat battery, the plate spring-like terminals to be provided to the battery receiving case for the associated equipment may be provided on one of respective surfaces of the positive and negative poles; thus, the thickness of the case can be made smaller than in the conventional arrangement. Since all the surface of the battery having no terminal holes is closely contacted by the battery receiving substantially positional deviation of the battery inside the battery receiving case can hardly take place even under vibration.

INDUSTRIAL APPLICABILITY

As described above, according to the present invention, it is possible to provide a flat battery which is thin and whose capacity per unit area is high, which battery is useful as a power source for a very thin desktop calculator and other battery-using equipment.

What is claimed is:

1. A flat battery comprising:
an electrically insulative sheathing film including a first film portion and a second film portion on opposite sides of a fold line, said film having an outer surface and an inner surface opposite said outer surface, on both of said first and said second film portions, said fold line dividing said inner surface into a first inner surface portion on said first film portion and a second inner surface portion on said second film portion, said film being folded along said fold line so that said first inner surface portion faces said second inner surface portion, said first and second film portions being sealed to one another along the entire peripheries thereof except along said fold line, said first film portion having first a first terminal hole and a second terminal hole formed therein;

a first collector formed in a plane on said first inner surface portion and having a first terminal portion covering said first terminal hole, said first terminal portion being exposed to the exterior of said battery through said first terminal hole so as to define a first terminal;

a second collector consisting of a first part formed on said first inner surface portion and a second part continuous to said first part formed on said second inner surface portion, said second collector extending across and being folded along said fold line, said second part having a second terminal portion covering said second terminal hole, said second terminal portion being exposed to the exterior of said battery through said second terminal hole so as to define a second terminal, said second part being formed in said plane in spaced non-overlapping relation to said first collector, one of said first and second collectors consisting of a positive collector, the other of said first and second collectors consisting of a negative collector, and a flat generating element between said first and second film portions, including a positive active material in contact with said positive collector, a negative active material in contact with said negative collector and a separator separating said positive and negative active materials.

2. A flat battery as set forth in claim 1, wherein said second collector is formed with V-shaped notches at opposite ends of said fold line.

3. A flat battery as set forth in claim 1, wherein said sheathing film is mainly a resin film of anti-electrolyte multilayer construction having a film-like heat sensitive adhesive layer disposed at said inner surface.

4. A flat battery as in claim 1, wherein said first collector and said second part of said second collector have generally L-shaped configurations, said film having respective first and second sides at opposite ends of said fold line, said first and second terminal holes being respectively located at said first and second sides said first collector being spaced from said second part of said second collector by a step-shaped continuous gap in said plane extending from said first side to said second side so as to separate said first terminal portion from said second terminal portion.

5. A flat battery as in claim 1, wherein said first and second film portions are heat sealed to one another along the entire peripheries thereof except along said fold line.

6. A flat battery as in claim 1, wherein said first collector is formed only on said first inner surface portion.

7. A flat battery comprising:

an electrically insulative sheathing film including a first film portion and a second film portion on opposite sides of a fold line, said film having an outer surface and an inner surface opposite said outer surface, on both of said first and said second film portions, said fold line dividing said inner surface into a first inner surface portion on said first film portion and a second inner surface portion on said second film portion, said film being folded along said fold line so that said first inner surface portion faces said second inner surface portion, said first and second film portions being sealed to one another along the entire peripheries thereof except along said fold line, said first film portion having first a first terminal hole and a second terminal hole formed therein;

a first collector formed in a plane on said first inner surface portion and having a first terminal portion covering said first terminal hole, said first terminal portion being exposed to the exterior of said battery through said first terminal hole so as to define a first terminal;

a second collector consisting of a first part formed on said first inner surface portion and a second part continuous to said first part formed on said second inner surface portion, said second collector extending across and being folded along said fold line, said second part having a second terminal portion covering said second terminal hole, said second terminal portion being exposed to the exterior of said battery through said second terminal hole so as to define a second terminal, said second part being formed in said plane in spaced non-overlapping relation to said first collector, one of said first and second collectors consisting of a positive collector, the other of said first and second collectors consisting of a negative collector;

a flat generating element between said first and second film portions, including a positive active material in contact with said positive collector, a negative active material in contact with said negative collector and a separator separating said positive and negative active materials; and an electrically insulative sheet over said second collector extending across said fold line between said second collector and said flat generating element and covering said second part.

8. A flat battery as set forth in claim 7, wherein the electrically insulating sheet is of L-shaped multilayer construction consisting of a heat resistant resin film and a heat sensitive resin adhesive film.

9. A flat battery as in claim 7, wherein said first collector and said second part of said second collector have generally L-shaped configurations, said film having respective first and second sides at opposite ends of said fold line, said first and seocnd terminal holes being respectively located at said first and second sides, said first collector being spaced from said second part of said second collector by a step-shaped continuous gap in said plane extending from said first side to said second side so as to separate said first terminal portion from said second terminal portion.

10. A flat battery as in claim 7, wherein said first collector is formed only on said first inner surface portion.

* * * * *